(12) United States Patent
Nelson et al.

(10) Patent No.: US 9,163,718 B2
(45) Date of Patent: Oct. 20, 2015

(54) HAPTIC FEEDBACK SHIFT KNOB

(71) Applicant: FORD GLOBAL TECHNOLOGIES, LLC, Dearborn, MI (US)

(72) Inventors: Zachary D. Nelson, Detroit, MI (US); David A. Evans, San Francisco, CA (US); Thomas J. Giuli, Mountain View, CA (US); David P. Melcher, Ypsilanti, MI (US); Christopher J. Peplin, Ann Arbor, MI (US); Jayanthi Rao, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 14/260,386

(22) Filed: Apr. 24, 2014

(65) Prior Publication Data
US 2014/0318293 A1   Oct. 30, 2014

Related U.S. Application Data

(60) Provisional application No. 61/815,420, filed on Apr. 24, 2013.

(51) Int. Cl.
*F16H 59/02* (2006.01)
*B60W 50/16* (2012.01)
*F16H 61/02* (2006.01)
*F16H 63/42* (2006.01)
*F16H 61/24* (2006.01)

(52) U.S. Cl.
CPC ............ *F16H 59/0278* (2013.01); *B60W 50/16* (2013.01); *F16H 2061/0218* (2013.01); *F16H 2061/241* (2013.01); *F16H 2063/426* (2013.01); *Y10T 74/2014* (2015.01)

(58) Field of Classification Search
CPC ........................... F16H 61/24; F16H 2061/248
See application file for complete search history.

(56) References Cited

U.S. PATENT DOCUMENTS

| | | | | |
|---|---|---|---|---|
| 4,896,556 A | * | 1/1990 | Takada | 74/523 |
| 2009/0248260 A1 | * | 10/2009 | Flanagan | 701/51 |
| 2010/0013621 A1 | * | 1/2010 | Kazyaka | 340/456 |
| 2010/0122600 A1 | * | 5/2010 | Armitage et al. | 74/473.29 |

* cited by examiner

*Primary Examiner* — Edwin A Young
(74) *Attorney, Agent, or Firm* — Frank MacKenzie; MacMillan, Sobanski & Todd, LLC

(57) ABSTRACT

Automotive vehicles having a manual shift transmission, with driver feedback to indicate when a shift change is recommended or to provide other event notifications.

14 Claims, 6 Drawing Sheets

HAPTIC FEEDBACK SHIFT KNOB

CROSS REFERENCE TO RELATED APPLICATIONS

This patent application claims priority to and the benefit of U.S. provisional application No. 61/815,420, filed Apr. 24, 2013, the full disclosure of which is incorporated herein by reference.

BACKGROUND OF THE INVENTION

The present invention relates in general to driver controls for automotive vehicles with a manual shift transmission, and, more specifically, to driver feedback to indicate when a shift change is recommended or to provide other event notifications.

Modern powertrain control systems monitor many vehicle parameters and execute sophisticated algorithms to optimize powertrain performance in real time. Depending upon regulatory requirements, the preference of the driver, or other factors, the optimization may be directed to different objectives such as best fuel economy, best power/acceleration, or a tradeoff between them. In an automatic transmission vehicle, the shift points between transmission gears may be determined and implemented by the powertrain controller in accordance with an optimization algorithm.

In a vehicle with a manually-controlled transmission, the powertrain controller does not implement a gear change. It is determined by the manual action of the driver. Nevertheless, it is common for the powertrain controller to run the algorithm for identifying an optimum time for shifting the gear and to generate a visual display to advise the driver when the optimum shift time occurs. A visual cue has been generated on the instrument cluster telling the driver when he or she should shift for optimal performance and/or increased vehicle fuel economy. This indication is usually in the form of an indicator light or a pop-up icon on a display. These require the driver to divert attention to the instrument cluster which is undesirable. Furthermore, the driver may not notice the visual cue and thus miss the opportunity to achieve better performance.

SUMMARY OF THE INVENTION

The Haptic Feedback Shift Knob of the present invention is a manual transmission shift knob capable of sending tactile, non-visual signals to the driver. When in operation, the device firsts detects if the driver has his or her hand on the shift knob and then sends a tactile pulse to the driver when he or she should shift for greatest performance or best fuel economy. A haptic "pulse" is felt through the shift knob and thus does not require the driver to take his/her eyes and attention away from the road. This improves safety while at the same time increasing fuel economy and vehicle performance.

The invention is also useful in performance race settings where attention to the road details is imperative for driver success. A race driver may have relied upon watching a tachometer for a desired engine speed to determine when to initiate an upshift or a downshift, which may take more attention than waiting for a simple visual cue. The driver can pay full attention to the road while waiting for the tactile, haptic feedback of the shift knob telling him or her when to shift. Auditory signals can be used in conjunction with the haptic feedback.

In addition to shift change notifications, the present invention may be configured to provide other driver configurable notifications, warnings, or status changes associated with vehicle systems or the driving situation (e.g., drifting out of a lane).

DETAILED DESCRIPTION OF PREFERRED EMBODIMENTS

Figure 1:
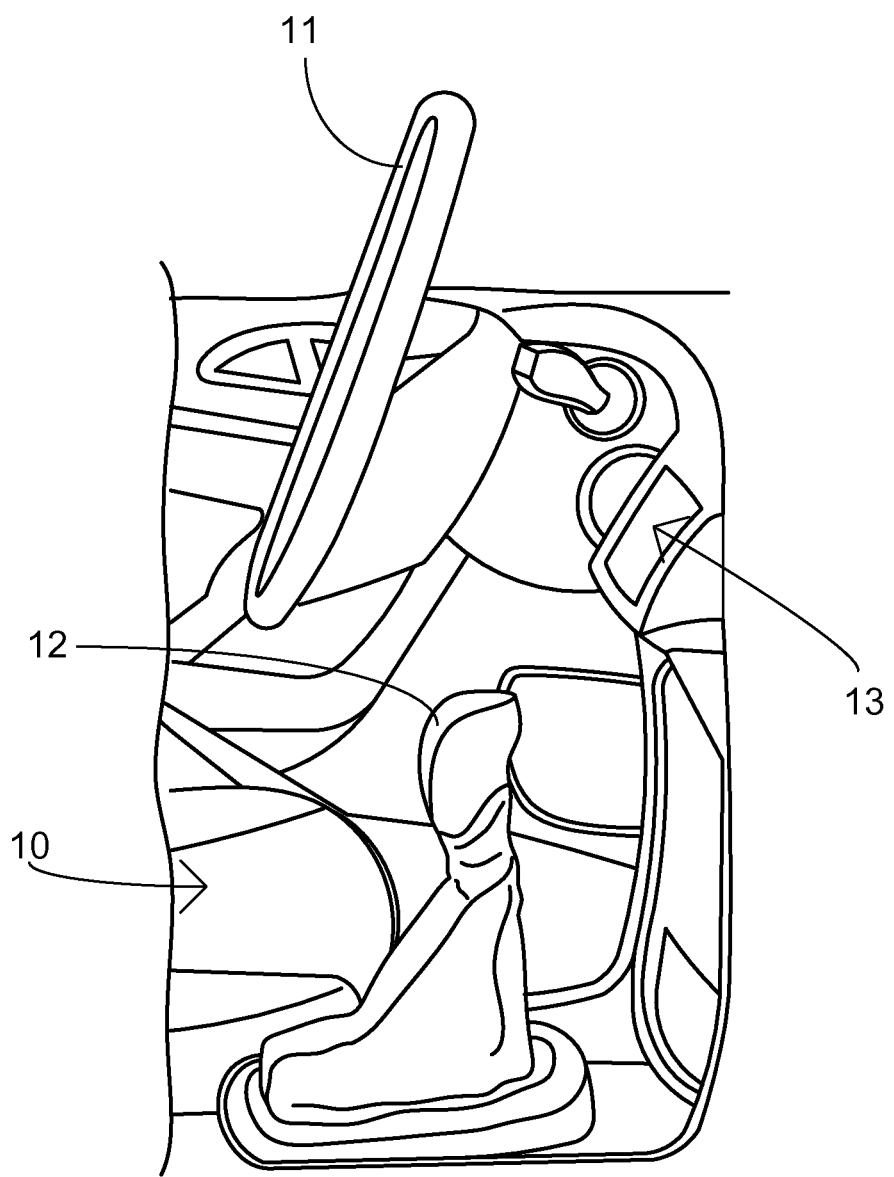
FIG. 1 shows an interior of a vehicle with a manual shift transmission.

A vehicle interior shown in FIG. 1 includes a seat 10 for accommodating a driver so that the driver can operate a steering wheel 11 and a manual gear shift lever 12. An instrument panel 13 includes display elements and input elements (e.g., pushbuttons or a touchscreen) for a human-machine interface (HMI). The vehicle includes an engine, transmission, electronic controller, sensors, and actuators (not shown) as known in the art for coordinating powertrain operation.

Figure 2:
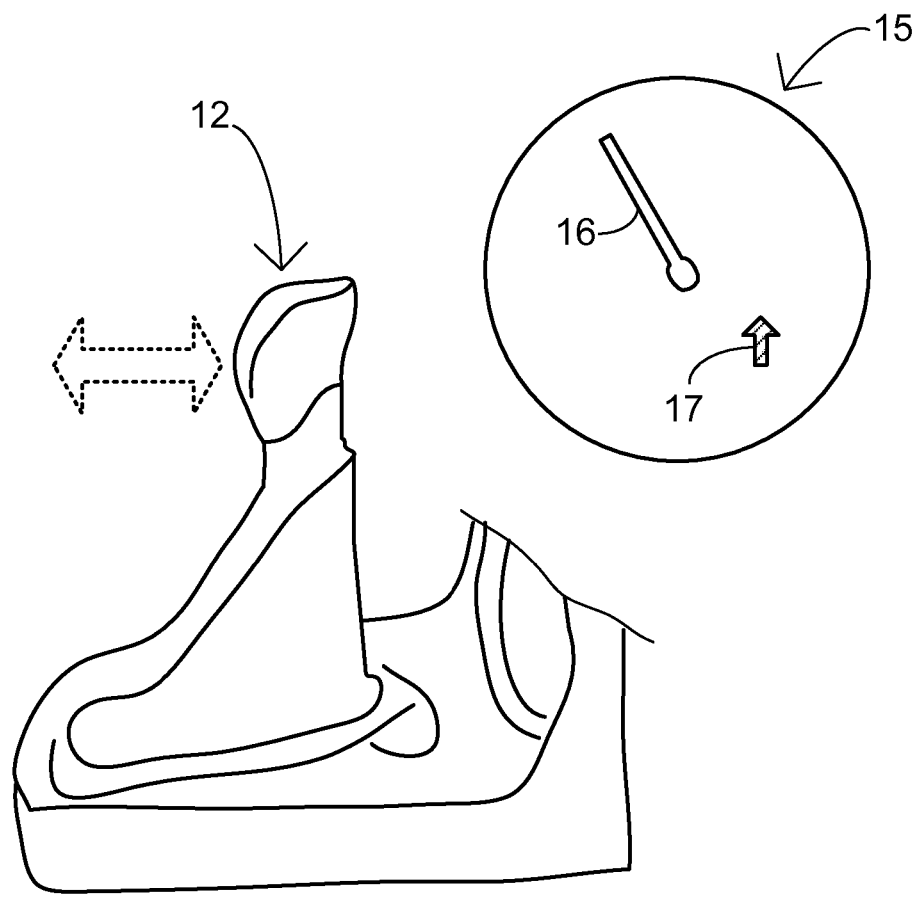
FIG. 2 shows a prior art system for providing a visual cue identifying the moment when a shift should occur.

In FIG. 2, an instrument panel display 15 includes a tachometer 16 together with an illuminated icon 17. Icon 17 is turned on to indicate to the driver the time when an upshift should occur. Another icon (not shown) would be illuminated having a different shape (e.g., pointing down) when the powertrain controller indicates that a downshift should occur.

Figure 3:
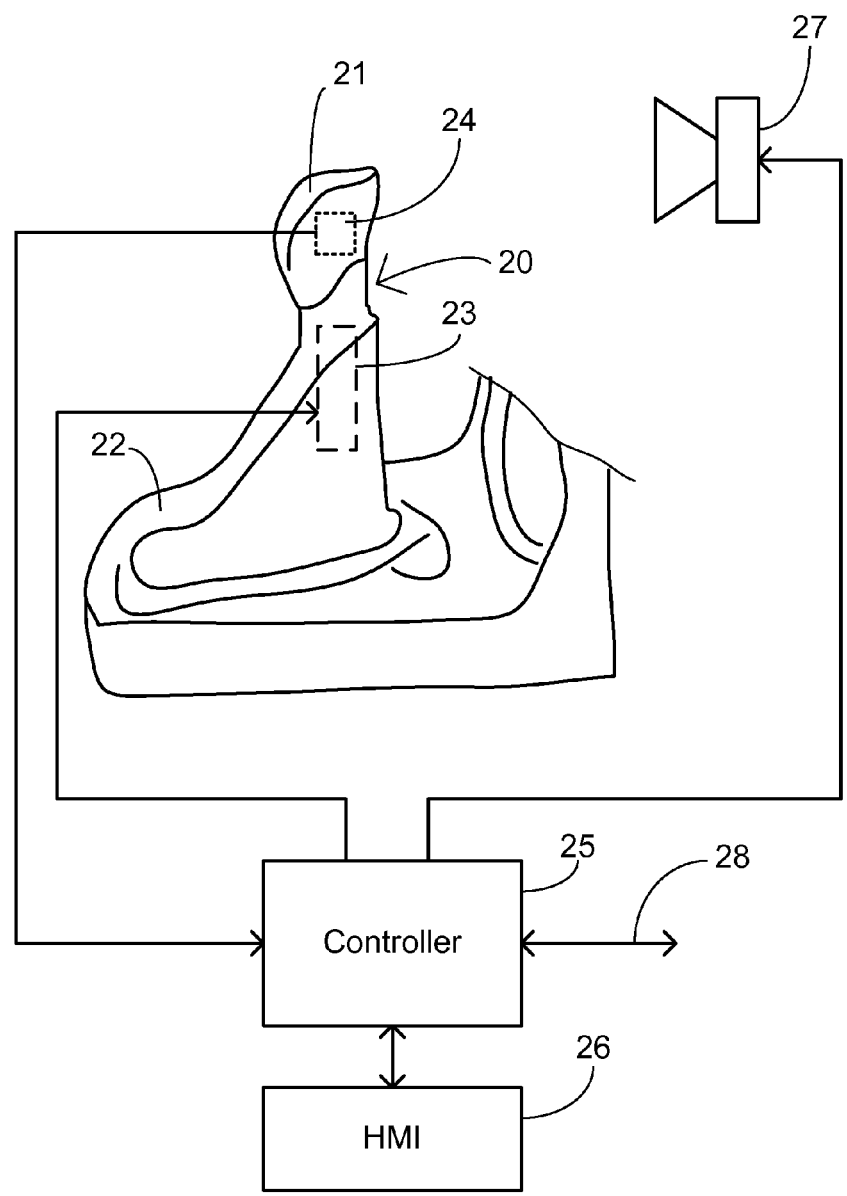
FIG. 3 shows a system according to the present invention for providing tactile feedback at the moment a shift should occur.

FIG. 3 shows a first embodiment of the invention wherein a manual shifter 20 includes a knob or handle 21 at the end of a lever concealed under a boot 22. A vibrating, haptic feedback device 23 is embedded within knob 21 or mounted on the lever in order to generate tactile vibrations that are perceived by the hand of the driver when it is in contact with knob 21. Knob 21 also preferably includes a sensor 24 for determining whether the driver's hand is in contact with knob 21. Sensor 24 may be a capacitive sensor, optical sensor, or mechanical pressure sensor, for example. Haptic device 23 and sensor 24 are electrically coupled to a controller 25. Controller 25 may be a standalone controller or can be included within a powertrain control module or a module that controls the instrument cluster, for example. Controller 25 is connected to a bus 28 for communicating with other electric modules and sensors within the vehicle.

Controller 25 is further connected with an HMI 26 and a sound transducer or speaker 27. Speaker 27 could be part of an audio entertainment system or a dedicated device to generate a recognizable sound (e.g., an auditory tone or synthesized voice) alerting the driver to shift. The audible feedback can be used either 1) together with the tactile feedback, or 2) only when the driver does not have their hand on the shift knob. This choice can be user configurable.

Figure 4:
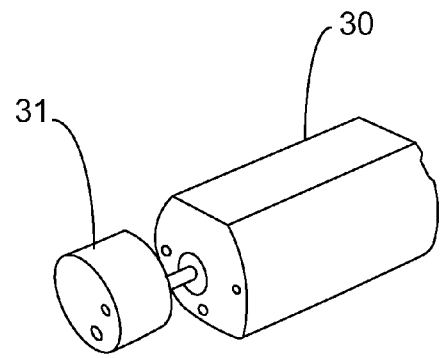
FIG. 4 shows a vibrating device to be incorporated with a shift knob.

FIG. 4 shows an example of an electromechanical vibrating device for use inside the shift knob. This works on the same principle that adds "vibrate" functionality to most cell phones. When a vibration motor 30 is connected to a power source, an off-balance mass 31 is rotated, thereby causing the whole shift knob to shake.

Figure 5:
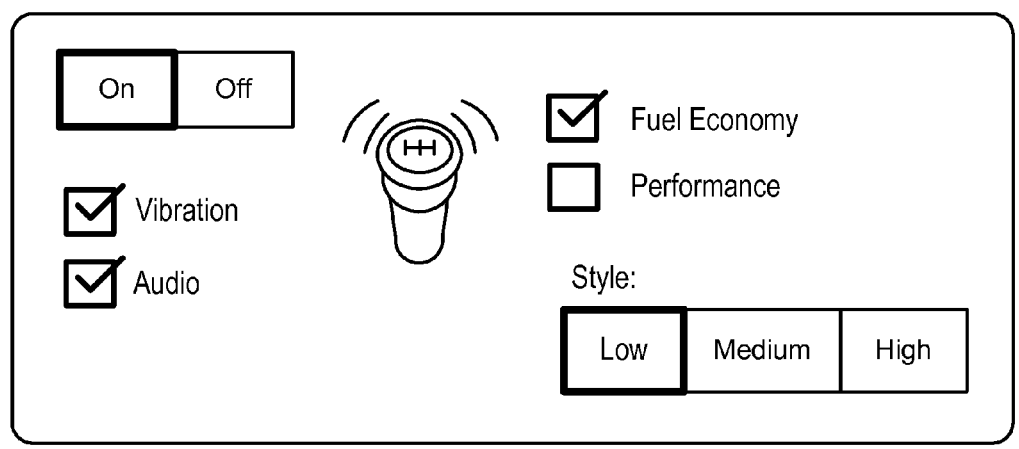
FIG. 5 shows an human-machine interface (HMI) for configuring operation of the haptic feedback.

FIG. 5 shows an HMI display for configuring the haptic feedback system. For example, the driver can turn feedback on or off, and they can selected whether to be alerted by vibration or audio, or both. The driver can select a type of optimization (e.g., either for fuel economy or performance). For the vibratory feedback, a style selection allows the driver to configure the strength of the vibrations between low, medium, and high (e.g., each corresponding to a different level of motor speed or torque).

Figure 6:
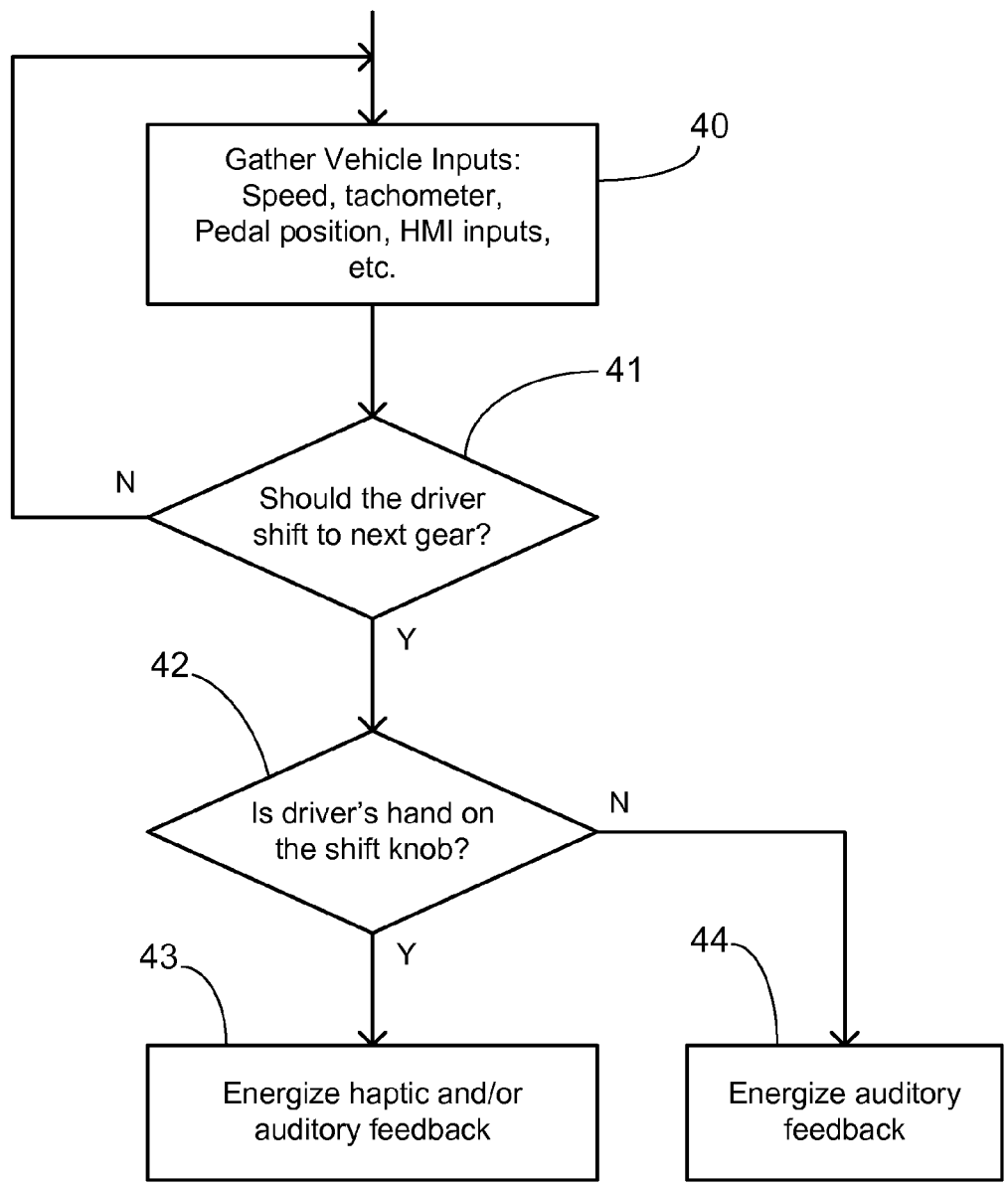
FIG. 6 is a flowchart of one preferred method of the invention.

FIG. 6 shows one preferred method of the invention. In step 40, the controller gathers vehicle inputs such as vehicle speed, engine speed (tachometer), throttle or pedal position, driver configured inputs, and other data needed to determine the proper time for shifting the manual transmission. In step 41, a check is made to determine whether the driver should shift to the next gear (e.g., up or down). If not, then the controller continues to monitor the data in step 40. If a recommended shift time has occurred, then a check is made in step 42 to determine whether the driver's hand is on the shift knob (e.g., by checking the output of the knob-mounted sensor). If the hand is present, then the haptic feedback is energized for a predetermined period of time in step 43. Depending on the configuration, the auditory feedback may also be generated in step 43. If the hand is not present on the shift knob, then only an auditory feedback can be optionally generated in step 44. After generating the feedback in steps 43 or 44, the method returns to step 40 for further monitoring.

Figure 7:
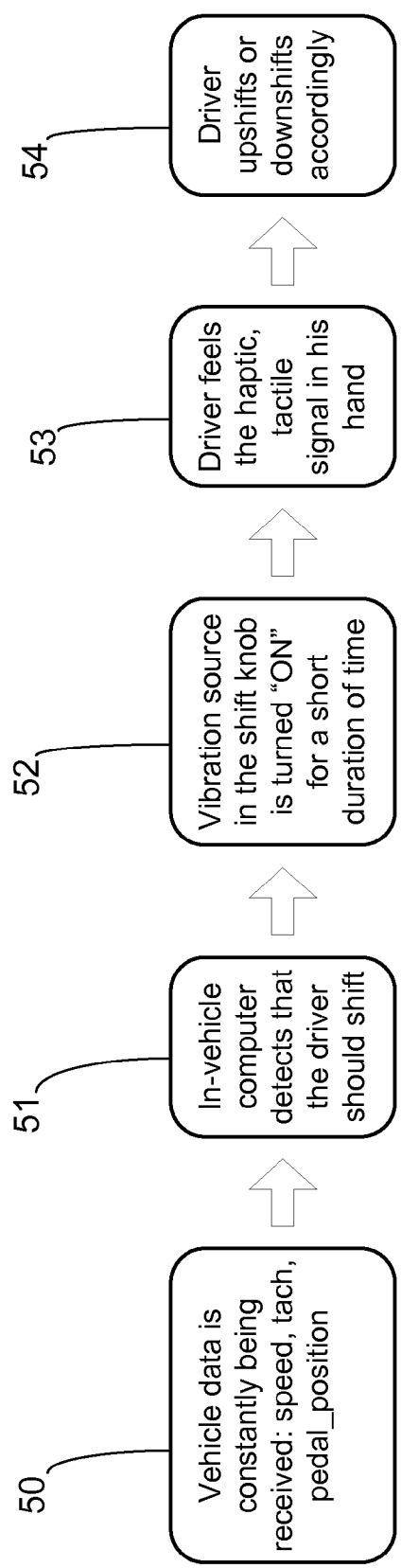
FIG. 7 shows a sequence of events associated with operation of the invention.

Based on the invention, a typical sequence of events is as shown in FIG. 7. At 50, vehicle data is constantly being received. At 51, the in-vehicle computer (e.g., powertrain control module) determines that the driver should execute a shift. At 52, the vibration source in the shift knob is turned on for a short time. As a result, the driver feels the haptic, tactile signal at 53. At 54, the driver accordingly upshifts or downshifts at the correct moment without having to direct their vision away from the external environment or road.

What is claimed is:

1. A manual-transmission vehicle comprising:
    a shift knob responsive to a driver for shifting a manual transmission;
    a haptic feedback device incorporated in the shift knob; and
    a controller determining a time for shifting the shift knob according to a powertrain optimization and activating the haptic feedback device at the determined time to provide a shift change notification to the driver as a tactile pulse.

2. The vehicle of claim 1 further comprising:
    a sensor incorporated in the shift knob to detect the presence of a driver's hand on the shift knob; and
    an auditory feedback device;
    wherein the controller activates the auditory feedback device at the determined time if the sensor does not detect the presence of the driver's hand.

3. The vehicle of claim 2 wherein the controller activates the haptic feedback device only if the sensor detects the presence of the driver's hand.

4. The vehicle of claim 1 further comprising:
    an auditory feedback device wherein the controller activates the auditory feedback device at the determined time together with the tactile pulse for the shift change notification.

5. The vehicle of claim 1 wherein the haptic feedback device is comprised of a motor and unbalanced mass configured to shake the shift knob when activated.

6. The vehicle of claim 1 further comprising a human machine interface responsive to the driver for configuring a strength of vibration for the tactile pulse.

7. The vehicle of claim 1 wherein the powertrain optimization is comprised of an optimization of fuel economy.

8. The vehicle of claim 1 further comprising a human machine interface responsive to the driver for configuring the powertrain optimization by selecting between a fuel economy optimization and a performance optimization.

9. A method for providing a shift change notification in a vehicle with a manual transmission, comprising the steps of:
    gathering vehicle data including a vehicle speed and engine speed to determine a time for shifting the manual transmission according to a powertrain optimization; and
    activating a haptic feedback device incorporated in a shift knob at the determined time to provide a shift change notification to a driver as a tactile pulse.

10. The method of claim 9 further comprising the step of activating an auditory feedback device at the determined time together with the tactile pulse for the shift change notification.

11. The method of claim 9 further comprising the step of configuring the powertrain optimization by selecting between a fuel economy optimization and a performance optimization.

12. A method for providing a shift change notification in a vehicle with a manual transmission, comprising the steps of:
    gathering vehicle data including a vehicle speed and engine speed to determine a time for shifting the manual transmission according to a powertrain optimization;
    checking for the presence of a driver's hand on a shift knob; and
    activating a haptic feedback device incorporated in the shift knob if the driver's hand is on the shift knob at the determined time to provide a shift change notification to the driver as a tactile pulse.

13. The method of claim 12 further comprising the step of:
    activating an auditory feedback device if the driver's hand is not on the shift knob at the determined time for the shift change notification.

14. The method of claim 12 further comprising the step of configuring the powertrain optimization by selecting between a fuel economy optimization and a performance optimization.

* * * * *